Nov. 18, 1941. K. PERKINS ET AL 2,263,470
SERVOMOTOR CONTROL SYSTEM
Filed Sept. 2, 1939  3 Sheets-Sheet 1

INVENTORS
KENDALL PERKINS,
LLOYD F. ENGELHARDT &
JOSEPH JERGER.
BY
ATTORNEY

Nov. 18, 1941.　　　K. PERKINS ET AL　　　2,263,470
SERVOMOTOR CONTROL SYSTEM
Filed Sept. 2, 1939　　　3 Sheets-Sheet 2

INVENTORS.
KENDALL PERKINS,
LLOYD F. ENGELHARDT &
JOSEPH JERGER.
BY
ATTORNEY

Nov. 18, 1941.   K. PERKINS ET AL   2,263,470
SERVOMOTOR CONTROL SYSTEM
Filed Sept. 2, 1939   3 Sheets-Sheet 3
FIG. 3.
FIG. 4.
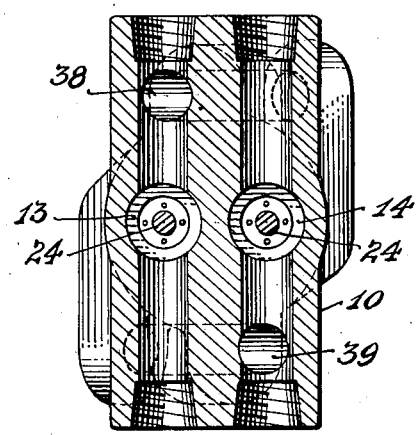
FIG. 5.
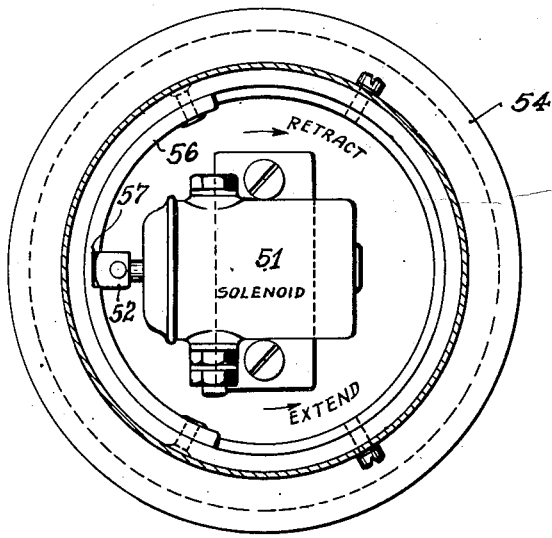
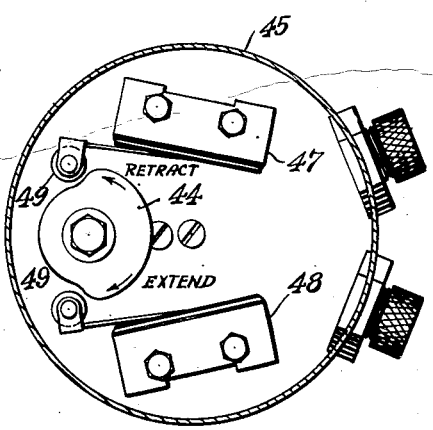
FIG. 6.
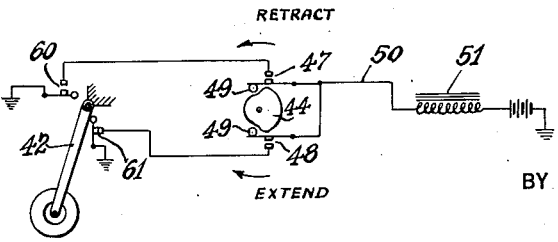
INVENTORS
KENDALL PERKINS,
LLOYD F. ENGELHARDT &
JOSEPH JERGER.
BY
ATTORNEY Patented Nov. 18, 1941

2,263,470

UNITED STATES PATENT OFFICE 2,263,470

SERVOMOTOR CONTROL SYSTEM

Kendall Perkins, Clayton, and Lloyd F. Engelhardt and Joseph Jerger, Ferguson, Mo., assignors to Curtiss-Wright Corporation, a corporation of Delaware Application September 2, 1939, Serial No. 293,224

12 Claims. (Cl. 121—38)

This invention relates to control systems and is concerned particularly with a novel form of hydraulic valve system and electrical control means therefor.

Although the invention may be used for various other purposes, it is primarily designed for use with retractable landing gears of aircraft and the detailed description of the invention is related particularly to this application.

An object of the invention is to provide a novel form of hydraulic valve mechanism by which a hydraulic motor, such as a landing gear extending and retracting mechanism, may be operated in forward or reverse directions by suitable manipulation of the valve, a further object of the invention comprising the provision of an automatic hydraulic lock when the control valve is neutralized by which the motor is held in either extreme forward or reverse position. A further object of the invention comprises an operating device for the valve which may be manipulated to either extreme forward or reverse position, additional mechanism responsive both to manipulation of the control member and to movement of the hydraulic motor effecting an automatic neutralization of the control valve when limiting positions of the motor have been reached without however altering the previously set position of the control member. The utility of the mechanism for fulfilling the above objective may be appreciated from the following: In an aircraft equipped with a power operated retractable landing gear the pilot is provided with a switch or control member which, after take-off has been effected, can be moved to the "retract" position. The mechanism of the invention thereupon initiates landing gear retraction and upon full retraction the motor means is deenergized and the system is locked from further movement. The control member is left in the "retract" position throughout flight and a glance at the member will immediately apprise the pilot that the landing gear is retracted.

When a landing is to be effected, the pilot moves the control member to the "extend" position whereupon landing gear extension is initiated and upon completion of this movement the system is locked in the landing gear extended condition and the control member remains in a similar position until further movement thereof is selectively effected.

It is believed that functioning of the above indicated type has been accomplished where electric motor means are used as a power source but hydraulic systems have gone into extensive use in aircraft and the system of this invention is related more particularly to control means for the hydraulic system.

Further objects of the invention will be appreciated as the description proceeds in connection with the drawings, in which Fig. 1 is a side elevation of the valve and control unit, partly in section;

Fig. 2 is a longitudinal section through the valve and control unit;

Figs. 3, 4 and 5 are sections respectively on the lines 3—3, 4—4 and 5—5 of Fig. 2.

Fig. 6 is a wiring diagram of the system, and

Fig. 7 is the section on the line 7—7 of Fig. 2.

Figure 2:
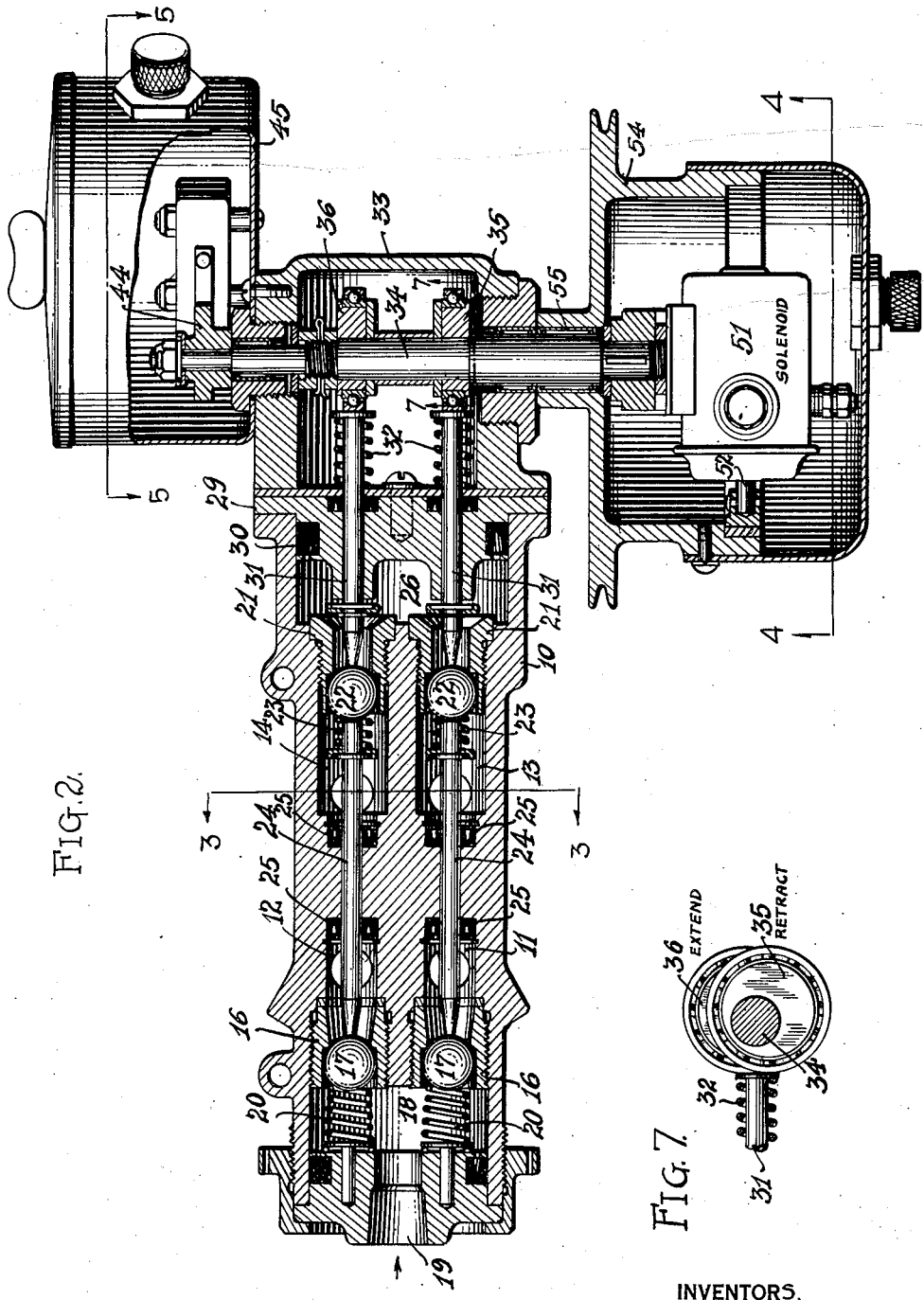

Referring first to Fig. 2 a valve housing is shown at 10 and comprises similar valve systems disposed in parallel, the two systems respectively comprising chambers 11 and 12 toward one end of the housing and chambers 13 and 14 at the other end of the housing. The chambers 11 and 12 are provided with screwed in valve seats 16 upon which balls 17 are engageable, the left ends of the seats 16 communicating with a pressure supply chamber 18 open at 19 to a fluid pressure supply line leading from any suitable source. The balls 17 are backed up by springs 20 normally holding them against their seats. Into the chambers 13 and 14 valve seats 21 are screwed each receiving a ball 22, the latter being held in seating engagement by springs 23 embracing rods 24 which pass through bores in the central part of the housing and are sealed with respect to the housing by cup packings 25. These rods 24 have slight clearance relative to their respective balls 17 and 22 when the latter are seated and if balls 22 be raised from their seats, balls 17 are likewise raised from their seats through the action of these rods.

Figure 1:
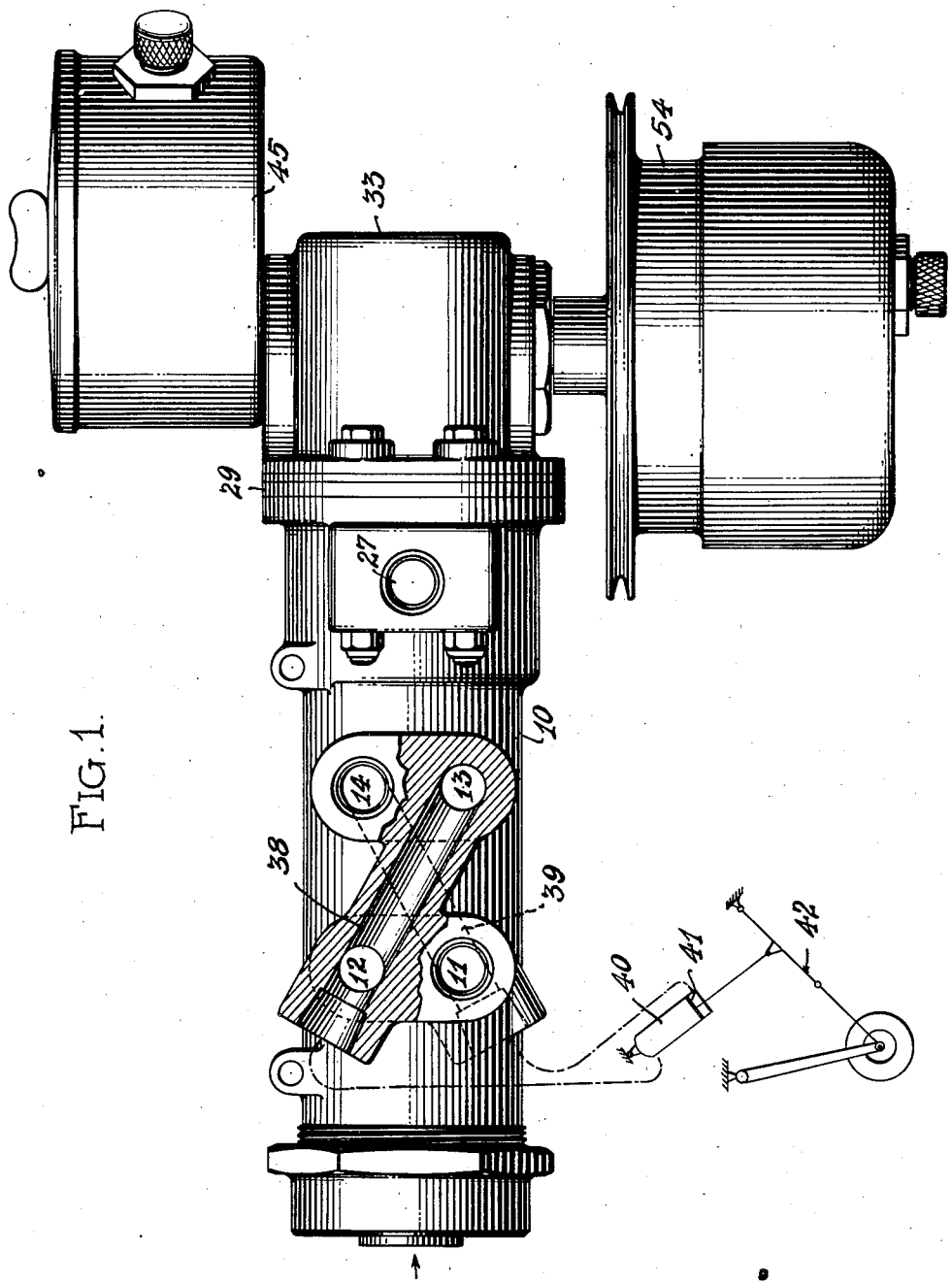

The righthand ends of the valve seats 21 communicate with a common chamber 26 open, through a connection 27 shown in Fig. 1, to an oil reservoir or sump. A cover 29 overlies the chamber 26 and is sealed thereto by a cup packing 30, the cover having drillings through which rods 31 extend, these rods being axially movable against springs 32 to raise respective ball valves from their seats. Over the cover 29 is secured a cam housing 33 carrying a shaft 34 upon which eccentrics 35 and 36 are secured. These eccentrics are shown in Fig. 7 and are disposed at 90° to one another so that, in the position as shown in Fig. 7 both eccentrics bear lightly upon their respective rods 31 but permit the balls 17 and 22 to close. If the shaft 34 be rotated clockwise the cam 35 will unseat its balls 17 and 22 permitting communication between the pressure chamber 18 and the chamber 11, and between the chamber 13 and the exhaust chamber 26. If the shaft 34 be rotated counter-clockwise, the cam 36 raises its balls 17 and 22 from their seats permitting communication between the pressure chamber 18 and the chamber 12 and between the chamber 14 and the exhaust chamber 26.

As shown in Fig. 1 the chambers 12 and 13 are cross-connected by a passage 38, and the chambers 11 and 14 are cross-connected by passage 39. These passages are respectively connected as indicated diagrammatically in Fig. 1 to the top and bottom of the cylinder 40 within which a piston 41 is slidable the rod thereof being connected to the landing gear 42 to raise and lower the same in response to pressure fluid application respectively upon the bottom and top portions of the cylinder 40. From the above, it will be apparent that if the eccentric 35 opens its respective valves, fluid will pass through the system to effect landing gear retraction while if the eccentric 36 is active to open its valves, the landing gear will be connected for extension. If both eccentrics 35 and 36 are inactive, the springs 20, 23 and 32 will close the hydraulic valves and the hydraulic system will be locked to hold the landing gear from further movement until one or the other of the eccentrics be again operated.

The shaft 34 carries at its upper end as shown in Fig. 2 a cam 44 the form of which is better shown in Fig. 5. The cam is embraced within a casing 45 in which switches 47 and 48 are open but if the cam lobe raises either roller 49, the respective switch is closed. These switches have a common wire 50 as shown in Fig. 6 leading to a solenoid 51 secured to the end of the shaft 34 opposite to the cam 44. The solenoid includes an armature secured to a detent 52 which is normally urged by a spring within the solenoid housing in a radially outward direction, the axis of the solenoid being crosswise of the shaft 34. Energization of the solenoid withdraws the detent 52 in a radially inward direction. The solenoid is embraced by a control pulley 54 floatingly borne on the shaft 34 through bushings 55. As shown in Fig. 4 the hollow of the pulley 54 is provided with a segmental track 56 having a notch 57 with which the detent 52 may engage. The solenoid, and hence the shaft 34, are rotatable with the pulley 54 when the detent 52 is engaged with the notch 57 but when the solenoid is energized, only at the top or bottom position, as when the cam 44 closes switches 47 or 48, this clutching connection is broken and the solenoid may rotate with respect to the pulley, springing back to the neutral positions of the eccentrics 35 and 36. However, if the pulley be subsequently rotated until the detent and notch are in alignment, the detent will reengage the notch and the members will be clutched for unitary rotation.

Reference may be made to Fig. 6 in which limit switches 60 and 61 are shown as being disposed adjacent the landing gear 42, the switch 60 being closable due to retraction of the landing gear to its extreme position and the switch 61 being closable upon extension of the landing gear to its extreme position.

The operation of the system is as follows:

If the landing gear be in a state of extension and it is desired to retract same, the pulley 54 is rotated clockwise (as in Fig. 4) by which the shaft 34 is turned clockwise so that hydraulic fluid is directed to the landing gear motor to retract the gear. This clockwise rotation also closes the switch 47. This control movement may be accomplished rapidly, while landing gear retraction follows up at a lower rate. Upon complete retraction of the landing gear the switch 60 is closed which, being in series with the switch 47 energizes the solenoid 51 to disengage the shaft 34 from the pulley 54. The springs then return the valve balls 17 and 22 to closed position and the system is locked, the springs also causing rotation of the shaft 34, without the pulley 54, to the central neutral position, concurrently opening the switch 47 to deenergize the solenoid.

When it is desired to extend the landing gear, the pulley 54 is rotated counterclockwise. During the first part of the rotation the detent 52 slides over the track 56 until the detent engages the notch 57 whereupon further anti-clockwise movement of the pulley rotates the shaft 34 until the cam 36 opens its valves at which time the cam 44 closes the switch 48. In due course fluid pressure extends the landing gear to close the switch 61 which, being in series with the switch 48, already closed, energizes the solenoid to release the detent 52 from the notch 57. Thereupon, the springs close the valves 17 and 22 and neutralize the position of the shaft 34, concurrently opening the switch 48 and de-energizing the solenoid.

From the above it will be seen that at all times during full extension and full retraction of the landing gear the valve system is locked and the solenoid circuit is open and also, that the pulley 54 may remain in the position indicating that the landing gear is either extended or retracted. But immediately upon movement of the pulley 54 to the position corresponding to the opposite position of the landing gear the system will be energized for effecting the landing gear function and will be deenergized as soon as that function has been completed.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a control system, a pressure line, an exhaust line, a reversible hydraulic motor, crossover valve means having resilient means operable to close off said lines from the motor and operable to connect said lines to the motor for forward or reverse operation thereof, a unitary control for said valve means, a manual control operator, a clutch normally connecting said control with said operator including a solenoid for disconnecting the clutch, switches closable upon control movement to respective forward of reverse positions, and switches closable upon motor movement to extreme forward or reverse positions, said switches being respectively serially connected with said solenoid.

2. In a control system, a limited movement motor, a control device having forward, reverse and neutral positions operably associated with the motor for effecting corresponding motor functions, means resiliently urging the device toward the neutral position, a control operating member movable with and with respect to said device, a clutch normally holding the member and device for unitary rotation, a solenoid for disengaging said clutch, switch means closable on movement of the device to the forward or reverse positions, switch means in series therewith responsive in closing to motor movement to limiting positions, and electrical circuits connecting said switches and solenoid.

3. In a control system, a control member movable against resilient means to extreme positions, switches closable upon member movement, a control operating member having a detent connection with said control member, a solenoid operable to disengage the detent in series with said switches, limited movement motor means controlled in its operation by said control member, and switches, in series with the other switches, closable upon limiting movement of said motor means, said solenoid being energized for detent disconnection when the first and second switches are closed to permit movement to neutral of the control member while the control operating member remains in the extreme position.

4. In a control system, a control member movable against resilient means to extreme positions, switches closable upon member movement, a control operating member having a detent connection with said control member, a solenoid operable to disengage the detent in series with said switches, limited movement motor means controlled in its operation by said control member, and switches, in series with the other switches, closable upon limiting movement of said motor means, said solenoid being energized for detent disconnection when the first and second switches are closed to permit movement to neutral of the control member while the control operating member remains in the extreme position, and said control member switch being operable to deenergize the solenoid so soon as the control member leaves its extreme position.

5. In a control system, a limited movement motor, control means therefor, movable to effect motor movement to both sides of neutral, and including a resilient neutralizing device, a control operating member clutchable to said control member, and means responsive to attainment of either limit position by said motor to disengage the control and operating members to allow of return of the former to neutral position, said neutral control member position having associated therewith means to lock the motor from further movement until the operating and control members are reengaged and jointly moved.

6. In a control system, a control member, a control operating member, a solenoid releasable detent normally locking said members together, and means responsive to movement of at least one of the members to its limit for energizing said solenoid.

7. In a control system, a limited movement controlled means, a control operating member, a control member operable to effect movement of said controlled means, a solenoid releasable detent normally locking said control operating and control members, and means responsive to movement of the controlled means and of the members to their respective limits for energizing said solenoid.

8. In a control system, a limited movement controlled means, a control operating member, a control member operable to effect movement of said controlled means and having a locking position, a solenoid releasable detent normally locking said control operating and control members, and means responsive to movement of the controlled means and of the members to their respective limits for energizing said solenoid, said operating member being returnable to a locking position, without the control operating member, upon such release.

9. In a control system, a limited movement controlled means, a control operating member, a control member operable to effect movement of said controlled means and having a locking position, a solenoid releasable detent normally locking said control operating and control members, and means responsive to movement of the controlled means and of the members to their respective limits for energizing said solenoid, said control member being returnable to a locking position, without the control operating member, upon such release, and upon such return deenergizing said solenoid.

10. In a control system, a limited movement hydraulic motor, a valve having forward and reverse positions which respectively pass fluid to the motor for forward and reverse movement, and having a neutral position wherein the motor is hydraulically locked from movement, a control operator having forward and reverse positions, means to clutch said control operator to the valve, and means responsive to motor movement to either the forward or reverse limit positions to declutch the control operator from the valve by which the latter is moved to said neutral locking position.

11. In a control system, a limited movement motor, control means therefor having forward and reverse positions which respectively actuate said motor for forward and reverse movement, and having a neutral position wherein the motor is locked from movement, a control operator having forward and reverse positions, means to clutch said control operator to said control means by which the latter is movable by the control operator to forward and reverse positions, and means responsive to motor movement to either forward or reverse limit positions to declutch the control operator from the control means by which the latter is moved to the neutral locking position.

12. In a control system, a limited movement motor, control means therefor having forward and reverse positions which respectively actuate said motor for forward and reverse movement, and having a neutral position wherein the motor is locked from movement, a control operator having forward and reverse positions, means to clutch said control operator to said control means by which the latter is movable by the control operator to forward and reverse positions, means responsive to motor movement to either forward or reverse limit positions to declutch the control operator from the control means by which the latter is moved to the neutral locking position, and means to resiliently urge said control means to the neutral position.

KENDALL PERKINS.
LLOYD F. ENGELHARDT.
JOSEPH JERGER.